(12) United States Patent
Feng et al.

(10) Patent No.: US 10,325,408 B2
(45) Date of Patent: *Jun. 18, 2019

(54) METHOD AND DEVICE FOR PRESENTING MULTIMEDIA INFORMATION

(71) Applicant: NextVPU (Shanghai) Co., Ltd., Shanghai (CN)

(72) Inventors: Xinpeng Feng, Shanghai (CN); Ji Zhou, Shanghai (CN)

(73) Assignee: Nextvpu (Shanghai) Co. Ltd., Pudong New District (CN)

( * ) Notice: Subject to any disclaimer, the term of this patent is extended or adjusted under 35 U.S.C. 154(b) by 51 days.

This patent is subject to a terminal disclaimer.

(21) Appl. No.: 15/410,891

(22) Filed: Jan. 20, 2017

(65) Prior Publication Data

US 2017/0213391 A1    Jul. 27, 2017

(30) Foreign Application Priority Data

Jan. 22, 2016 (CN) .......................... 2014 1 0044505
Jan. 22, 2016 (CN) .......................... 2016 1 0044190

(51) Int. Cl.
*G06T 7/30* (2017.01)
*G06T 19/00* (2011.01)
(Continued)

(52) U.S. Cl.
CPC ............ *G06T 19/006* (2013.01); *G06F 3/012* (2013.01); *G06T 7/30* (2017.01); *G06T 7/40* (2013.01);
(Continued)

(58) Field of Classification Search
CPC .......... G06T 19/006; G06T 7/30; G06T 7/40; G06T 7/60; G06T 17/20; G06T 19/00; G06F 3/012; G09G 5/00
(Continued)

(56) References Cited

U.S. PATENT DOCUMENTS 7,876,914 B2 * 1/2011 Grosvenor ............ H04H 60/47
381/122
8,219,409 B2 * 7/2012 Vetterli ................. G10L 19/008
704/200
(Continued)

FOREIGN PATENT DOCUMENTS

CN    101159854 A    4/2008
CN    102231726 A    11/2011
(Continued)

OTHER PUBLICATIONS

Lee, Minhaeng, and Charless Fowlkes. "Space-Time Localization and Mapping." Oct. 2017, www.ics.uci.edu/~fowlkes/papers/lf-iccv2017.pdf.*
(Continued)

*Primary Examiner* — Thomas J Lett
(74) *Attorney, Agent, or Firm* — Harness, Dickey & Pierce, P.L.C.

(57) ABSTRACT

A method and a device for presenting multimedia information are disclosed. The method includes: acquiring representation information, the representation information including electromagnetic-field spectral information for representing an object, the electromagnetic-field spectral information being observable for a naked eye and/or acquirable for a device; establishing a four-dimensional time-space model for characterizing the representation information according to the acquired representation information, the four-dimensional time-space model having an attribute for characterizing in a digital form variation of the representation information over time; and presenting the representation information characterized by the four-dimensional time-space model. In the solution, the four-dimensional time-space model has an attribute for characterizing in a digital form variation of the representation information over time. Thereby, the problem of delay in presenting representation
(Continued)

information may be solved to some degree. Therefore, the solution may solve the defects of delay in the related art to some degree.

18 Claims, 10 Drawing Sheets

(51) Int. Cl.
  G06F 3/01 (2006.01)
  G06T 7/40 (2017.01)
  G06T 7/60 (2017.01)
  G06T 17/20 (2006.01)
  G09G 5/00 (2006.01)

(52) U.S. Cl.
  CPC ............... *G06T 7/60* (2013.01); *G06T 17/20* (2013.01); *G06T 19/00* (2013.01); *G09G 5/00* (2013.01); *G06T 2200/04* (2013.01); *G06T 2207/10028* (2013.01); *G06T 2219/004* (2013.01); *G09G 2310/08* (2013.01)

(58) Field of Classification Search
  USPC .......................................................... 345/423
  See application file for complete search history.

(56) References Cited

U.S. PATENT DOCUMENTS

| | | | | |
|---|---|---|---|---|
| 2004/0104935 | A1* | 6/2004 | Williamson | G06F 3/012 715/757 |
| 2009/0238378 | A1* | 9/2009 | Kikinis | H04N 13/0296 381/92 |
| 2010/0295921 | A1* | 11/2010 | Guthrie | G06F 3/011 348/14.08 |
| 2011/0029933 | A1* | 2/2011 | Chu | G06F 17/30 715/854 |
| 2011/0300929 | A1* | 12/2011 | Tardif | A63F 13/213 463/30 |
| 2012/0250820 | A1* | 10/2012 | Haras | A61B 6/03 378/9 |
| 2012/0270653 | A1* | 10/2012 | Kareemi | A63F 13/52 463/33 |
| 2013/0342568 | A1* | 12/2013 | Ambrus | G09G 3/003 345/633 |
| 2014/0306866 | A1* | 10/2014 | Miller | G06T 19/006 345/8 |
| 2016/0005344 | A1 | 1/2016 | Stine | |
| 2016/0080710 | A1* | 3/2016 | Hattingh | H04N 9/3185 348/52 |
| 2016/0109284 | A1* | 4/2016 | Hammershoi | G01H 7/00 73/586 |
| 2016/0307335 | A1* | 10/2016 | Perry | G06T 7/2093 |
| 2016/0379083 | A1* | 12/2016 | Sala | G06K 9/52 345/633 |
| 2017/0109916 | A1* | 4/2017 | Kurz | G06T 11/60 |
| 2017/0213392 | A1* | 7/2017 | Feng | G06T 9/001 |

FOREIGN PATENT DOCUMENTS

| | | |
|---|---|---|
| CN | 103716586 A | 4/2014 |
| CN | 102910353 A | 5/2014 |
| CN | 104183014 A | 12/2014 |
| CN | 104539929 A | 4/2015 |
| CN | 105188516 A | 12/2015 |
| CN | 105893452 A | 8/2016 |
| CN | 105894571 A | 8/2016 |
| CN | 105894581 A | 8/2016 |

OTHER PUBLICATIONS

CN Office Action dated Jan 4. 2019.
Shahram Izadi et al.; KinectFusion: Real-time 3D Reconstruction and Interaction using a Moving Depth Camera; Oct. 16, 2011; pp. 559-568.
Mao Ye et al.; 3D Reconstruction in the Presence of Glasses by Acoustic and Stereo Fusion; 2015; pp. 4885-4893.
Zainab Namh Sultani et al.; Kinect 3D Point Cloud Live Video Streaming; Procedia Computer Science, V 65, 2015, pp. 125-132.
David Ganter; Kenect Stream Recording, Point Cloud Extraction and Point Cloud Registration—Report; 2013.
EPO Supplemental Search Report dated Oct. 18, 2018.

\* cited by examiner

METHOD AND DEVICE FOR PRESENTING MULTIMEDIA INFORMATION

CROSS REFERENCE

This application is based upon and claims priority to Chinese Patent Application No. 201610044505.7 and No. 201610044190.6, filed on Jan. 22, 2016 and Jan. 22, 2016 respectively, the entire contents thereof are incorporated herein by reference.

TECHNICAL FIELD

The present disclosure generally relates to the technical field of communication, and more particularly, to a method and a device for presenting multimedia information.

BACKGROUND

With development of communication technology, communication has changed from original single voice demand to video and audio communication demand. Therefore, video communication service which integrates voice, data and video is becoming more and more important in communication field. It has found wide application in meeting television, remote video medical, remote video education and other fields.

Virtual Reality (VR) technology is a highly realistic human-computer interaction technology that can simulate human perception of vision, hearing and touch. It can make a user felling like being in a computer-generated environment in which the user may "interact" or "speak" to straightforwardly with his or her sense, language or gestures, and may even move freely to explore the surroundings. Since the user may see objects, hear sounds and feel forces in the computer-generated environments, he or she may feel like being completely located in it.

However, currently, in the VR technology, collected multimedia information are processed with a method which cannot process in real time the collected multimedia information. Therefore, there is a time delay between the moment for presenting multimedia information and the time in the real scenario where the multimedia information comes from.

Accordingly, the existing method for presenting multimedia information has a drawback of prolonged delay.

SUMMARY

In view of the above problem, an objective of the present disclosure is to provide a method and a device for presenting multimedia information which may overcome the above problem or at least partly solve the above problem.

According to a first aspect of the present disclosure, there is provided a method for presenting multimedia information, including:

acquiring representation information, the representation information including electromagnetic-field spectral information for representing an object, the electromagnetic-field spectral information being observable for a naked eye and/or acquirable for a device;

establishing a four-dimensional time-space model for characterizing the representation information according to the acquired representation information, the four-dimensional time-space model having an attribute for characterizing in a digital form variation of the representation information over time; and presenting the representation information characterized by the four-dimensional time-space model.

Optionally, in the method for presenting multimedia information according to the above embodiment of the present disclosure, the representation information further includes acoustic-field information which can be sensed by ear and/or acquirable for a device;

before the step of establishing a four-dimensional time-space model according to the acquired representation information, the method further includes: calculating acoustic-field information of an object corresponding to the representation information according to the representation information; and the step of establishing a four-dimensional time-space model for characterizing the representation information according to the representation information includes: establishing a four-dimensional time-space model for characterizing the representation information and the acoustic-field information according to the representation information and the acoustic-field information.

Optionally, in the method for presenting multimedia information according to any of the above embodiments of the present disclosure, the step of establishing a four-dimensional time-space model for characterizing the representation information according to the acquired representation information, includes:

processing the representation information to obtain first annotation information;

obtaining first point-cloud information containing geometric information, second point-cloud information containing texture information according to the first annotation information and the representation information;

merging the first point-cloud information and the second point-cloud information to obtain target point-cloud information;

obtaining visual information according to the target point-cloud information;

obtaining a space model according to the visual information, merging space models of a plurality of moments to obtain a space module; and obtaining the four-dimensional time-space model according to the obtained space module, the first annotation information and second annotation information.

Optionally, in the method for presenting multimedia information according to any of the above embodiments of the present disclosure, the representation information further includes acoustic-field information which can be sensed by ear and/or acquirable for a device;

before the step of obtaining a space model according to the visual information, the method further includes: calculating acoustic-field information of an object corresponding to the representation information according to the representation information; and the step of obtaining a space model according to the visual information includes: merging the visual information and the acoustic-field information to obtain the space model.

Optionally, in the method for presenting multimedia information according to any of the above embodiments of the present disclosure, after the step of merging the first point-cloud information and the second point-cloud information to obtain target point-cloud information, and before the step of obtaining visual information according to the target point-cloud information, the method further includes: processing the target point-cloud information to obtain second annotation information; and the step of obtaining visual information according to the target point-cloud information includes: obtaining the visual information according to the second annotation information and the target point-cloud information.

Optionally, in the method for presenting multimedia information according to any of the above embodiments of the present disclosure, the step of obtaining the visual information according to the annotation information and the target point-cloud information includes:

optimizing a geometric vertex position of the target point-cloud information and calculating a normal of the target point-cloud information, to obtain a first result;

performing a surface fitting process and a triangular meshing process on the first result to obtain a second result; and obtaining the visual information according to the second result.

Optionally, in the method for presenting multimedia information according to any of the above embodiments of the present disclosure, the step of processing the representation information to obtain first annotation information includes:

performing digital image process and analysis on the representation information to obtain the first annotation information.

Optionally, in the method for presenting multimedia information according to any of the above embodiments of the present disclosure, the step of obtaining first point-cloud information containing geometric information according to the first annotation information and the representation information includes:

processing the representation information according to the first annotation information to obtain coordinate information of an object corresponding to the representation information; and generating first point-cloud information containing the geometric information according to the coordinate information.

Optionally, in the method for presenting multimedia information according to any of the above embodiments of the present disclosure, the step of obtaining second point-cloud information containing texture information according to the first annotation information and the representation information includes:

extracting information from the representation information according to the first annotation information in a point-by-point manner and/or by image synthesis, to obtain the second point-cloud information containing texture information.

Optionally, in the method for presenting multimedia information according to any of the above embodiments of the present disclosure, the step of obtaining the visual information according to the second annotation information and the target point-cloud information includes:

calculating surface normal information of the object according to the second annotation information and the target point-cloud information; and obtaining the visual information according to the surface normal information.

Optionally, in the method for presenting multimedia information according to any of the above embodiments of the present disclosure, before the step of presenting the representation information characterized by the four-dimensional time-space model, the method further includes: merging the four-dimensional time-space model and a first time-space model, to obtain a target four-dimensional time-space model, the first time-space model is for characterizing representation information of an object at a place where the multimedia information is presented; and the step of presenting the representation information characterized by the four-dimensional time-space model includes: presenting the representation information characterized by the four-dimensional time-space model and the representation information characterized by the first time-space model according to the target four-dimensional time-space model.

Optionally, in the method for presenting multimedia information according to any of the above embodiments of the present disclosure, before the step of presenting the representation information characterized by the four-dimensional time-space model, the method further includes: merging the four-dimensional time-space model and a first time-space model and a second time-space model which are located locally at the device, to obtain a target four-dimensional time-space model, the first time-space model is for characterizing representation information of an object at a place where the multimedia information is presented, and the second time-space model is for characterizing representation information of a virtual object; and the step of presenting the representation information characterized by the four-dimensional time-space model includes: presenting the representation information characterized by the four-dimensional time-space model, the representation information characterized by the first time-space model and the representation information characterized by the second time-space model according to the target four-dimensional time-space model.

Optionally, in the method for presenting multimedia information according to any of the above embodiments of the present disclosure, the representation information further includes acoustic-field information which can be sensed by ear and/or acquirable for a device; and the four-dimensional time-space model further characterizes acoustic-field information of an object corresponding to the representation information; and the method further includes:

playing the acoustic-field information characterized by the four-dimensional time-space model.

Optionally, in the method for presenting multimedia information according to any of the above embodiments of the present disclosure, before the step of presenting the representation information characterized by the four-dimensional time-space model, the method further includes: determining a front orientation of a device for presenting the multimedia information; and the step of presenting the representation information characterized by the four-dimensional time-space model includes: presenting the representation information characterized by the four-dimensional time-space model according to the front orientation.

Optionally, in the method for presenting multimedia information according to any of the above embodiments of the present disclosure, the method further includes:

determining a front orientation of a device for presenting the multimedia information and target multimedia information; and feeding back the front orientation and the target multimedia information to a device for sending the representation information.

According to a second aspect of the present disclosure, there is provided a device for presenting multimedia information, including:

an acquiring unit configured to acquire representation information, the representation information including electromagnetic-field spectral information for representing an object, the electromagnetic-field spectral information being observable for a naked eye and/or acquirable for a device;

a model establishing unit configured to establish a four-dimensional time-space model for characterizing the representation information according to the acquired representation information, the four-dimensional time-space model having an attribute for characterizing in a digital form variation of the representation information over time; and a presenting unit configured to present the representation information characterized by the four-dimensional time-space model.

Optionally, in the device for presenting multimedia information according to the above embodiment of the present disclosure, the representation information further includes acoustic-field information which can be sensed by ear and/or acquirable for a device;

the device further includes:

an acoustic-field-information calculating unit configured to calculate acoustic-field information of an object corresponding to the representation information according to the representation information; and the model establishing unit establishing a four-dimensional time-space model for characterizing the representation information according to the representation information specifically include: establishing a four-dimensional time-space model for characterizing the representation information and the acoustic-field information according to the representation information and the acoustic-field information.

Optionally, in the device for presenting multimedia information according to any of the above embodiments of the present disclosure, the model establishing unit includes a first-annotation-information generating unit, a point-cloud-information generating unit, a point-cloud-information merging unit, a visual information and a four-dimensional-time-space-model generating unit, wherein the first-annotation-information generating unit is configured to process the representation information to obtain first annotation information;

the point-cloud-information generating unit is configured to obtain first point-cloud information containing geometric information, second point-cloud information containing texture information according to the first annotation information and the representation information;

the point-cloud-information merging unit is configured to merge the first point-cloud information and the second point-cloud information to obtain target point-cloud information;

the visual-information generating unit is configured to obtain visual information according to the target point-cloud information;

the four-dimensional-time-space-model generating unit is configured to obtain a space model according to the visual information, merging space models of a plurality of moments to obtain a space module; and obtain the four-dimensional time-space model according to the obtained space module, the first annotation information and second annotation information.

Optionally, in the device for presenting multimedia information according to any of the above embodiments of the present disclosure, the representation information further includes acoustic-field information which can be sensed by ear and/or acquirable for a device;

the device further includes:

an acoustic-field-information calculating unit configured to calculate acoustic-field information of an object corresponding to the representation information according to the representation information; and the four-dimensional-time-space-model generating unit obtaining a space model according to the visual information specifically includes: merging the visual information and the acoustic-field information to obtain the space model.

Optionally, in the device for presenting multimedia information according to any of the above embodiments of the present disclosure, the point-cloud-information generating unit includes: a second-annotation-information generating unit configured to process the target point-cloud information to obtain second annotation information; and the visual-information generating unit obtaining visual information according to the target point-cloud information includes: obtaining the visual information according to the second annotation information and the target point-cloud information.

Optionally, in the device for presenting multimedia information according to any of the above embodiments of the present disclosure, the visual-information generating unit is further configured to:

optimize a geometric vertex position of the target point-cloud information and calculate a normal of the target point-cloud information, to obtain a first result;

perform a surface fitting process and a triangular meshing process on the first result to obtain a second result; and obtain the visual information according to the second result.

Optionally, in the device for presenting multimedia information according to any of the above embodiments of the present disclosure, the first-annotation-information generating unit processing the representation information to obtain first annotation information specifically includes:

performing digital image process and analysis on the representation information to obtain the first annotation information.

Optionally, in the device for presenting multimedia information according to any of the above embodiments of the present disclosure, the point-cloud-information generating unit obtaining first point-cloud information containing geometric information according to the first annotation information and the representation information specifically includes:

processing the representation information according to the first annotation information to obtain coordinate information of an object corresponding to the representation information; and generating first point-cloud information containing the geometric information according to the coordinate information.

Optionally, in the device for presenting multimedia information according to any of the above embodiments of the present disclosure, the point-cloud-information generating unit obtaining second point-cloud information containing texture information according to the first annotation information and the representation information specifically includes:

extracting information from the representation information according to the first annotation information in a point-by-point manner and/or by image synthesis, to obtain the second point-cloud information containing texture information.

Optionally, in the device for presenting multimedia information according to any of the above embodiments of the present disclosure, the visual-information generating unit obtaining the visual information according to the second annotation information and the target point-cloud information specifically includes:

calculating surface normal information of the object; and obtaining the visual information according to the surface normal information.

Optionally, in the device for presenting multimedia information according to any of the above embodiments of the present disclosure, the device further includes:

a model-merging unit configured to merge the four-dimensional time-space model and a first time-space model, to obtain a target four-dimensional time-space model, the first time-space model is for characterizing representation information of an object at a place where the multimedia information is presented; and the presenting unit presenting the representation information characterized by the four-dimensional time-space model specifically includes: presenting the representation information characterized by the four-dimensional time-space model and the representation information characterized by the first time-space model according to the target four-dimensional time-space model.

Optionally, in the device for presenting multimedia information according to any of the above embodiments of the present disclosure, before the step of presenting the representation information characterized by the four-dimensional time-space model, the device further includes:

a model merging unit configured to merge the four-dimensional time-space model and a first time-space model and a second time-space model which are located locally at the device, to obtain a target four-dimensional time-space model, the first time-space model is for characterizing representation information of an object at a place where the multimedia information is presented, and the second time-space model is for characterizing representation information of a virtual object; and the presenting unit presenting the representation information characterized by the four-dimensional time-space model specifically includes: presenting the representation information characterized by the four-dimensional time-space model, the representation information characterized by the first time-space model and the representation information characterized by the second time-space model according to the target four-dimensional time-space model.

Optionally, in the device for presenting multimedia information according to any of the above embodiments of the present disclosure, the representation information further includes acoustic-field information which can be sensed by ear and/or acquirable for a device; and the four-dimensional time-space model further characterizes acoustic-field information of an object corresponding to the representation information; and the device further includes:

a playing unit configured to play the acoustic-field information characterized by the four-dimensional time-space model.

Optionally, in the device for presenting multimedia information according to any of the above embodiments of the present disclosure, the device further includes: a processing unit configured to determine a front orientation of a device for presenting the multimedia information; and the presenting unit presenting the representation information characterized by the four-dimensional time-space model specifically includes: presenting the representation information characterized by the four-dimensional time-space model according to the front orientation.

Optionally, in the device for presenting multimedia information according to any of the above embodiments of the present disclosure, the device further includes:

a processing unit configured to determine a front orientation of a device for presenting the multimedia information and target multimedia information; and the device further includes a feed-back unit configured to feed back the front orientation and the target multimedia information to a device for sending the representation information.

In the embodiments of the present disclosure, a method and a device for presenting multimedia information are provided, in which representation information is acquired, the representation information including electromagnetic-field spectral information for representing an object, the electromagnetic-field spectral information being observable for a naked eye and/or acquirable for a device; a four-dimensional time-space model for characterizing the representation information is established according to the acquired representation information, the four-dimensional time-space model having an attribute for characterizing in a digital form variation of the representation information over time; and the representation information characterized by the four-dimensional time-space model is presented. In the solution, the four-dimensional time-space model has an attribute for characterizing in a digital form variation of the representation information over time. Thereby, the problem of delay in presenting representation information may be solved to some degree. Therefore, the solution may solve the defects of delay in the related art to some degree.

The above description is merely a summary of the technical solution of the present disclosure. In order for better understanding the technical solution of the present disclosure, reference may be made to the contents of the detailed description. These and other objectives, features and advantages of the present disclosure will become more readily apparent to those skilled in the art from the following detailed description of the present disclosure below.

BRIEF DESCRIPTION OF THE DRAWINGS

Various other advantages and benefits will become apparent to those skilled in the art upon review of the following detailed description of exemplary embodiments. The drawings are for the purpose of illustrating the exemplary embodiments only and are not to be construed as limiting the present disclosure. And the same reference numerals will be used throughout the drawings to refer to like parts. In the drawings.

DETAILED DESCRIPTION

Figure 1A:
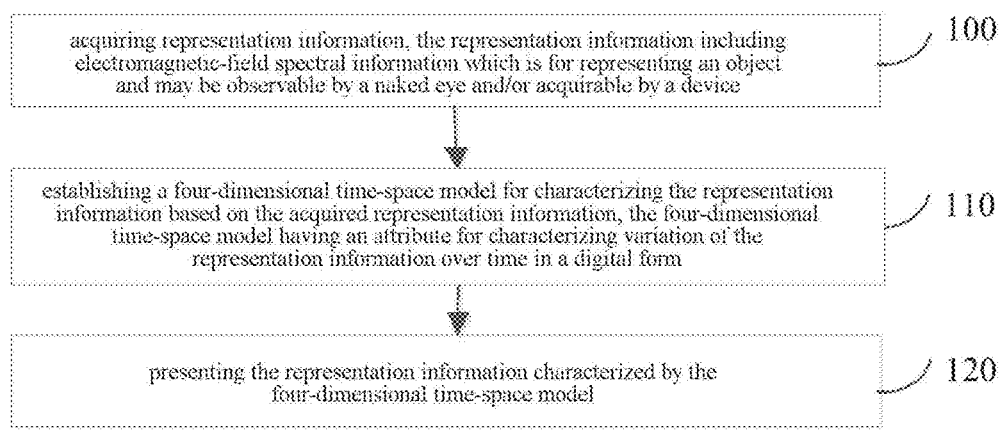
FIG. 1A is a flow chart illustrating a method for presenting multimedia information according to an embodiment of the present disclosure.

To make the objectives, technical solutions and advantages of the present disclosure clearer, the present disclosure will be described in further detail with reference to the accompanying drawings. Apparently, the described embodiments are only a part of the present disclosure, but not all of them. Other embodiments acquired by those skilled in the art based on the embodiments of the present disclosure without creative effort are all within the scope of the present disclosure.

The method and apparatus for presenting multimedia information proposed by the present disclosure may be applied in the scenarios including but not limited to:

Real-time communication scenario. For example, a person A captures information about himself and a surrounding environment and transmits the information in real time to another person B for the person B to roam in the environment and interact with the person A. For another example, each of the person A and the person B captures information about himself and his environment and transmits the information to the other party in real time. Optionally, the person A and the person B may roam in the environment physically located by them, or may roam in an environment of any third party, and the person A and the person B may interact with each other.

Remote observation and monitoring scenario.

Operation scenario. For example, a remote office for one or more persons, immersing in a remote meeting, immersing in a remote cooperation or solving problems for a client remotely, or immersing in a remote training.

Educational scenario. For example, one can immerse himself in a virtual classroom and interact with a teacher in a virtual environment.

Medical scenario. For example, telemedicine and interaction with a doctor in a virtual environment.

Business scenario. For example, remote shopping and interaction with a business man in a virtual environment, or experiencing an all-round dressing mirror.

Sports scenario. For example, one or more persons may match with a sprint champion in a virtual environment.

Entertainment scenario. For example, one or more person may play a game in a virtual space, and may immerse in a live television or interact with a film character.

Personal life scenario. For example, four-dimensional diary recording and screening, remotely visiting a museum, remote companion of family members or a pet, or remote adult applications.

It may also be applied in the following scenarios:

Virtual reality or scenarios generated from augmented reality content, including film, television, games, video content production. Or, a four-dimensional history of a particular time, space, and place.

According to an embodiment of the present disclosure, a method for presenting multimedia information may be performed by a computing device. The computing device may be, for example, a general-purpose computing device or a special-purpose computing device running a general-purpose operating system or a special-purpose operating system, such as a desktop computer, a notebook computer, a server, a workstation, a tablet computer, a smartphone. The computing device may include at least one processor that cooperates with a memory and a plurality of other modules. The processor may include a plurality of cores for multi-threading or parallel processing. The memory may include one or more storage devices, a memory, or a storage device therein, including a non-volatile computer-readable recording/storage medium.

FIG. 1A is a flow chart illustrating a method for presenting multimedia information according to an embodiment of the present disclosure. The method includes the following steps.

In step 100, representation information is acquired, the representation information including electromagnetic-field spectral information. The electromagnetic-field spectral information is for representing an object and may be observable for a naked eye and/or acquirable for a device.

In an embodiment of the present disclosure, in step 100, the representation information may be acquired by the computing device, or may be sent from other devices, which will not be limited herein.

In an embodiment of the present disclosure, the representation information may be acquired at various spaces and/or at various times.

In step 110, a four-dimensional time-space model for characterizing the representation information is established based on the acquired representation information. The four-dimensional time-space model has an attribute for characterizing variation of the representation information over time in a digital form.

In an embodiment of the present disclosure, the four-dimensional time-space model at least includes the following attributes:

a spatial-position attribute, which may refer to a coordinate in a coordinate system fixed over time for each point of an object at any moment;

an appearance attribute, which may refer to a texture and a spectral characteristic (such as color) of a surface of an object at any time, or a geometric characteristic (such as normal, curvature, smoothness, etc.) of a surface of an object;

a sound attribute;

a motion attribute, which may refer to a motion velocity vector, an acceleration vector of each point on an object at any moment, or may refer to an angular velocity vector or an angular acceleration vector of each section of an object which may be seen as a rigid body; and other attribute, which may refer to at least one kind of information that may be inferred from the representation information or variation of the representation information over time, including category, identity, material, mutual relation, etc.

The four-dimensional time-space model may be stored in a storage medium in a digital data form. The digital data form may be stored, presented, retrieved, edited, transmitted, encrypted and used for more advanced intelligent applications.

In an embodiment of the present disclosure, after the four-dimensional time-space model is established, the four-dimensional time-space model may be further modified, improved and optimized.

In practical application, in addition to the electromagnetic-field spectral information for representing an object, which may be observable for a naked eye and/or acquirable for a device, the representation information may also include acoustic-field information. That is, the representation information may also include acoustic-field information which may be sensed by ear and/or acquirable for a device. In this case, before the four-dimensional time-space model is established according to the acquired representation information, the method may also include the following operation:

acoustic-field information of an object corresponding to the representation information is calculated according to the representation information.

The step of establishing a four-dimensional time-space model for characterizing the representation information according to the representation information may specifically include: a four-dimensional time-space model for characterizing the representation information and the acoustic-field information is established according to the representation information and the acoustic-field information.

In an embodiment of the present disclosure, the acoustic information described may not only include audio information but also may include information about a spatial position of a sound source. Moreover, the acoustic information may include acquired sound wave information and/or ultrasound wave information.

In an embodiment of the present disclosure, the step of establishing a four-dimensional time-space model for characterizing the representation information according to the representation information may be performed in the following manner:

the representation information is processed to obtain first annotation information;

first point-cloud information containing geometric information and second point-cloud information containing texture information are obtained according to the first annotation information and the representation information;

the first point-cloud information and the second point-cloud information are merged to obtain target point-cloud information;

visual information is obtained according to the target point-cloud information;

a space model is obtained according to the visual information, space models of a plurality of moments are merged to obtain a space module; and the four-dimensional time-space model is obtained according to the obtained space module, the first annotation information and second annotation information.

As used herein, point-cloud information refers to a set of data points in some coordinate system. In a three-dimensional coordinate system, these points are usually defined by X, Y, and Z coordinates, and are often intended to represent the external surface of an object.

As used herein, the first annotation information refers to a result obtained from processes such as segmentation, detection, tracking, and recognition of the representation information, when the representation information is subjected to digital image processing analysis.

As used herein, the second annotation information refers to a result obtained from processing on the target point-cloud information.

In an embodiment of the present disclosure, the representation information may also include acoustic-field information which can be sensed by ear and/or acquirable for a device.

In this case, before the step of obtaining a space model according to the visual information, the method may also include the following operations:

acoustic-field information of an object corresponding to the representation information is calculated according to the representation information.

In an embodiment of the present disclosure, optionally, the step of obtaining a space model according to the visual information may be performed in the following manner:

merging the visual information and the acoustic-field information to obtain the space model.

In an embodiment of the present disclosure, after the step of merging the first point-cloud information and the second point-cloud information to obtain target point-cloud information, and before the step of obtaining visual information according to the target point-cloud information, the method may also include the following operation:

the target point-cloud information is processed to obtain second annotation information.

In this case, the step of obtaining visual information according to the target point-cloud information may specifically include:

the visual information is obtained according to the second annotation information and the target point-cloud information.

In an embodiment of the present disclosure, optionally, the step of obtaining the visual information according to the annotation information and the target point-cloud information may be performed in the following manner:

a geometric vertex position of the target point-cloud information is optimized and a normal of the target point-cloud information is calculated, to obtain a first result;

a surface fitting process and a triangular meshing process are performed on the first result to obtain a second result; and the visual information is obtained according to the second result.

In an embodiment of the present disclosure, optionally, the step of processing the representation information to obtain first annotation information may be performed in the following manner:

digital image process and analysis is performed on the representation information to obtain the first annotation information.

In an embodiment of the present disclosure, optionally, the step of performing digital image process on the representation information may be conducted in the following manner:

the representation information is segmented, detected, tracked or identified.

In an embodiment of the present disclosure, the sequence of segmentation, detection, tracking and identification is not limited. For example, the representation information may be firstly segmented and then detected, or may be firstly detected and then segmented. In order to improve the accuracy of the first annotation information, segmentation, detection, tracking and identification may be performed repeatedly for several times. For example, after a cycle of segmentation, detection, tracking and identification is performed, depending on the result, at least one more cycle of segmentation, detection, tracking and identification may be performed to improve the accuracy.

In an embodiment of the present disclosure, segmentation may refer to segmenting the image into a foreground section and a background section. For example, the image is segmented into a sky section, a ground section and other sections. Detection may refer to detecting a passenger, detecting a license plate of a car, and so on. Tracking may refer to tracking an arm movement of a person, for example. Identification may refer to identify a vehicle, for example.

In an embodiment of the present disclosure, the step of obtaining first point-cloud information containing geometric information according to the first annotation information and the representation information may be performed in the following manner:

the representation information is processed according to the first annotation information to obtain coordinate information of an object corresponding to the representation information; and first point-cloud information containing the geometric information is generated according to the coordinate information.

In an embodiment of the present disclosure, the coordinate information of the object corresponding to the representation information may correspond to different coordinate systems at different moments. In this case, in order to improve the accuracy of the first point-cloud information, after the coordinate information of the object corresponding to the representation information is obtained, coordinate information of the object corresponding to the representation information in different local coordinate systems at different moments may be merged to the same coordinate system. Then, the first point-cloud information containing the geometric information may be generated according to the coordinate information merged to the same coordinate system.

In an embodiment of the present disclosure, optionally, the step of obtaining second point-cloud information containing texture information according to the first annotation information and the representation information may be performed in the following manner:

information is extracted from the representation information according to the first annotation information in a point-by-point manner and/or by image synthesis, to obtain the second point-cloud information containing texture information.

In an embodiment of the present disclosure, optionally, the step of obtaining the visual information according to the second annotation information and the target point-cloud information may be performed in the following manner:

surface normal information of the object is calculated according to the second annotation information and the target point-cloud information; and the visual information is obtained according to the surface normal information.

Figure 1B:
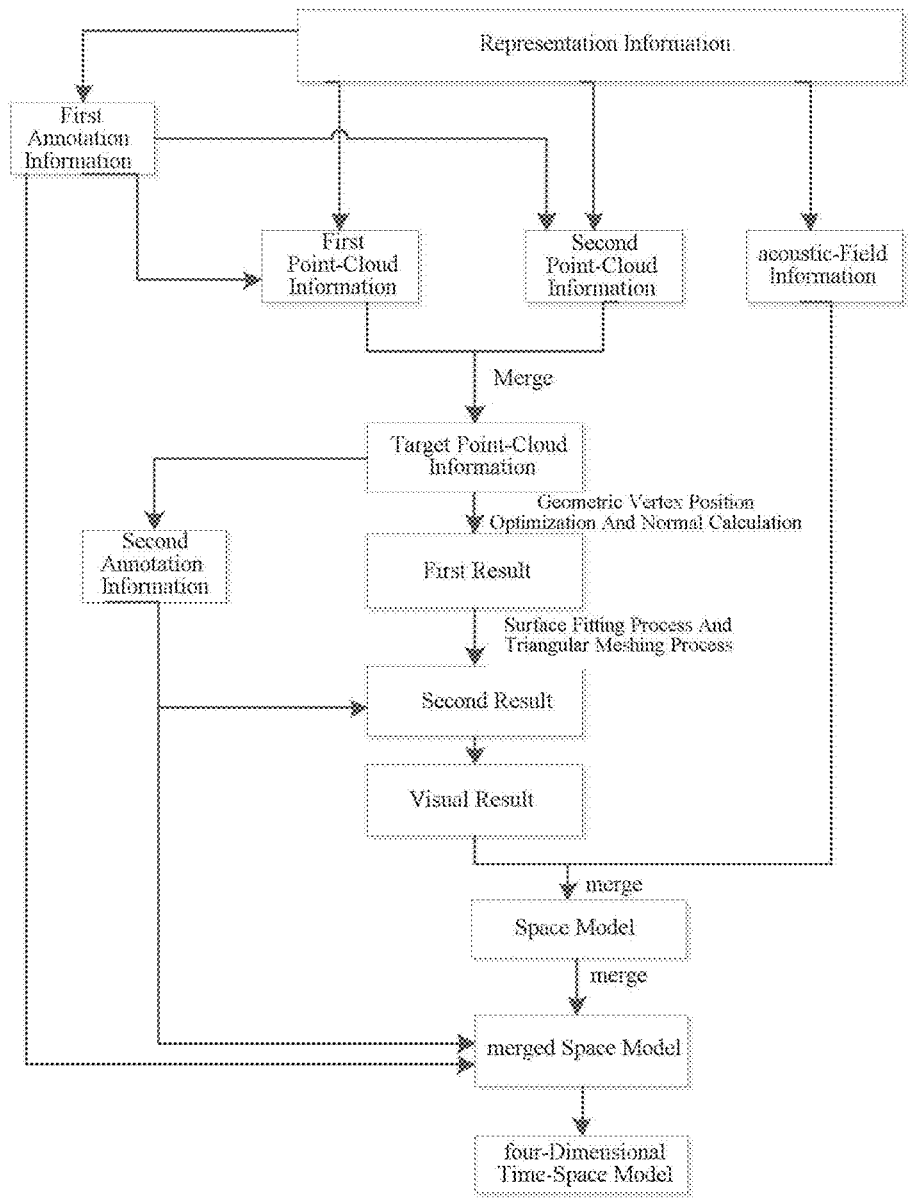
FIG. 1B is another flow chart illustrating a process for establishing a four-dimensional time-space model according to an embodiment of the present disclosure.

The present disclosure provides a detailed description of the process of establishing the four-dimensional time-space model. As shown in FIG. 1B, the first annotation information and the acoustic-field information are obtained according to the representation information. The first point-cloud information and the second point-cloud information are obtained according to the representation information and the first annotation information. The first point-cloud information and the second point-cloud information are merged to obtain the target point-cloud information. The second annotation information is obtained according to the target point-cloud information. The geometric vertex position of the target point-cloud information is optimized and the normal of the target point-cloud information is calculated to obtain a first result. A surface fitting process and a triangular meshing process are performed on the first result to obtain a second result. The visual information is obtained according to the second result and the second annotation information. The visual information and the acoustic-field information are merged to obtain a space model. The space models are merged to obtain a merged space model. The merged space model, the first annotation information and the second annotation information are processed to obtain the four-dimensional time-space model.

In step 120, the representation information characterized by the four-dimensional time-space model is presented.

In an embodiment of the present disclosure, further, the scenario at the device for presenting the multimedia information may also be presented. To this end, before the step of presenting the representation information characterized by the four-dimensional time-space model, the method may also include the following operation.

the four-dimensional time-space model and a first time-space model are merged, to obtain a target four-dimensional time-space model, the first time-space model is for characterizing representation information of an object at a place where the multimedia information is presented.

In this case, optionally, the step of presenting the representation information characterized by the four-dimensional time-space model may be performed in the following manner:

the representation information characterized by the four-dimensional time-space model and the representation information characterized by the first time-space model are presented according to the target four-dimensional time-space model.

For example, the scenario corresponding to the representation information characterized by the four-dimensional time-space model is a seaside scenario, and the scenario corresponding to the representation information characterized by the first time-space model is an office desk scenario. In this case, the presented scenario may be a scenario merging the seaside at a front side of the office desk.

Further, a human body or an object may be detected, tracked and identified. A real physical region may be superposed on a virtual region. For example, an observer wearing a VR helmet sees grassland, while in reality, the observer is in a room with a wall. At this time, through "detection based on objects", information of the real physical wall may be superposed on the grassland in the VR helmet, to present a translucent wall in the grassland. For another example, through human hand detection, a gesture of a real hand may be detected, and then a virtual hand may be superposed on a four-dimensional model. That is, some virtual scenarios may be merged. To this end, before the step of presenting the representation information characterized by the four-dimensional time-space model, the method may also include the following operation:

the four-dimensional time-space model and a first time-space model and a second time-space model which are located locally at the device are merged, to obtain a target four-dimensional time-space model. The first time-space model is for characterizing representation information of an object at a place where the multimedia information is presented, and the second time-space model is for characterizing representation information of a virtual object.

In this case, optionally, the step of presenting the representation information characterized by the four-dimensional time-space model may be performed in the following manner:

the representation information characterized by the four-dimensional time-space model, the representation information characterized by the first time-space model and the representation information characterized by the second time-space model are presented according to the target four-dimensional time-space model.

For example, the scenario corresponding to the representation information characterized by the four-dimensional time-space model is a seaside scenario, and the scenario corresponding to the representation information characterized by the first time-space model is an office desk scenario. Then, the scenario presented may be a scenario merging the seaside at a front side of the office desk. Further, if a pot of flower is to be presented on the office desk while in reality there is no flower on the desk. In this case, the flower may be characterized by a second time-space model, and the four-dimensional time-space model, the first time-space model and the second time-space model locally at the device for presenting the multimedia information are merged to obtain a target four-dimensional time-space model. Then, the scenario presented may be a scenario in which seaside is before the office desk, and flower is placed on the office desk.

In an embodiment of the present disclosure, the presented scenario not only has a picture, but also has a sound. To this end, the representation information may also include acoustic-field information which can be sensed by ear and/or acquirable for a device. The four-dimensional time-space model further characterizes acoustic-field information of an object corresponding to the representation information. In this case, the method may also include the following operation:

the acoustic-field information characterized by the four-dimensional time-space model is played.

In an embodiment of the present disclosure, in order to improve the similarity between the scenario corresponding to the presented representation information and the real scenario, the representation information characterized by the four-dimensional time-space model may be presented with reference to front orientation information of the device for presenting the multimedia information. To this end, before the step of presenting the representation information characterized by the four-dimensional time-space model, the method may also include the following operation:

a front orientation of a device for presenting the multimedia information is determined.

In this case, the step of presenting the representation information characterized by the four-dimensional time-space model may be performed in the following manner:

the representation information characterized by the four-dimensional time-space model is presented according to the front orientation.

In an embodiment of the present disclosure, optionally, the step of determining a front orientation of a device for presenting the multimedia information may be performed in the following manner:

resolving an attitude of the device for presenting the multimedia information through an inertial navigation associated with the device, to obtain the front orientation information of the device for presenting the multimedia information.

In the embodiment, the inertial navigation may be any one or any combination of a gyroscope, a magnetometer, and an accelerometer.

In an embodiment of the present disclosure, accuracy of an observer-interested part may be selectively improved. To this end, the method may also include the following operation:

a front orientation of a device for presenting the multimedia and target multimedia information are determined; and the front orientation and the target multimedia information are fed back to a device for sending the representation information.

For example, the scenario corresponding to the representation information has a beach, a person and a sailboat. If the eyeball of the user holding the device for presenting the multimedia information is fixed on the person, the person may be taken as the target multimedia information. Then, during the step of acquiring representation information, the device for sending the four-dimensional time-space model may only acquire representation information of the person and not acquire representation information of the sailboat.

In an embodiment of the present disclosure, the multimedia information may also be determined by an "eyeball" of a camera of the device for presenting the multimedia information.

It should be noted that, in the embodiment of the present disclosure, the first time-space model and the second time-space model as described may be established by the device for presenting the multimedia information in advance or in real time. Alternatively, the first time-space model and the second time-space model may be established in advance by other device, or may be established by other device and sent to the device for presenting the multimedia information in real time. This is not limited in the present disclosure.

In an embodiment of the present disclosure, in some scenarios, it is possible to present only the representation information characterized by the four-dimensional space-time model. For example, in a remote office or a remote communication scenario, the device for presenting the multimedia information may only require experience of a "real remote" scenario sent from the device for sending the four-dimensional time-space model. In this case, only the representation information characterized by the four-dimensional time-space model is required to be presented. In some scenarios, based on the representation information characterized by the four-dimensional time-space model, the representation information characterized by the first time-space model or the representation information characterized by the second time-space model may be further presented. In addition to that, the terminal for presenting representation information may also add some virtual props. For example, the device for presenting multimedia information requires not only experience of the scenario sent from the device for sending the four-dimensional time-space model, but also requires virtual props to be added in the scenario. For example, by swing a hand, a white board may appear in the sky, or for a game, some virtual props may be added (for example, a "lightning" is emitted from a hand and hits a rock in the scenario).

In an embodiment of the present disclosure, further, the first annotation information and/or the second annotation information may also be presented.

In an embodiment of the present disclosure, four-dimensional time-space models respectively sent from multiple devices may be received. For example, representation information characterized by a first four-dimensional time-space model sent from a first sending terminal corresponding to a scenario of the Temple of Heaven; representation information characterized by a second four-dimensional time-space model sent from a second sending terminal corresponding to a scenario of the Eiffel Tower. Then, the Temple of Heaven and the Eiffel Tower may be presented in parallel.

Figure 1C:
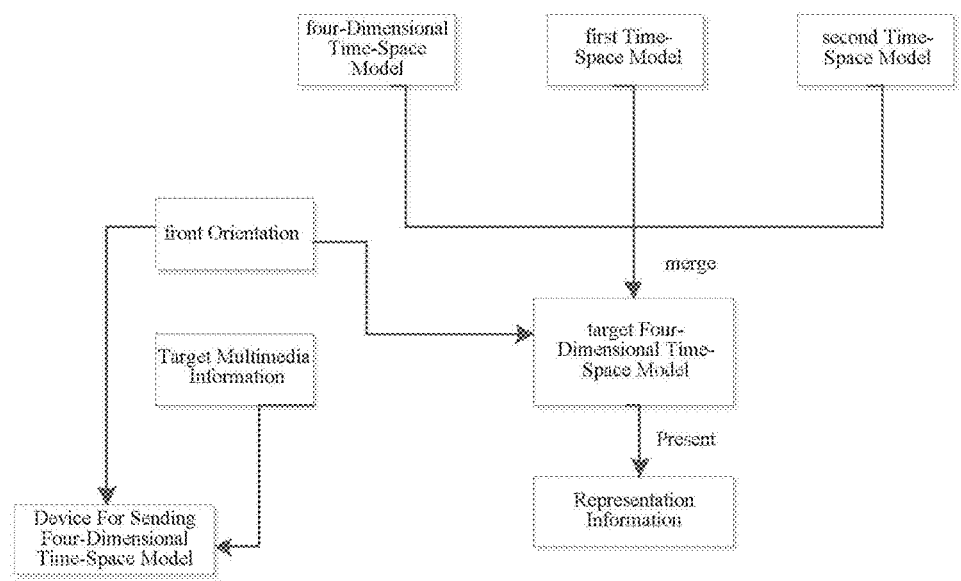
FIG. 1C is another flow chart illustrating a method for presenting multimedia information according to an embodiment of the present disclosure.

In the present disclosure, a process for presenting a four-dimensional time-space model is illustrated in FIG. 1C, through which, the four-dimensional time-space model, the first time-space model and the second time-space model may be merged to obtain a target four-dimensional time-space model. Front orientation information of a device for presenting the multimedia information and the target multimedia information are determined. Representation information characterized by the four-dimensional time-space model may be presented according to the front orientation information and the target four-dimensional time-space model. The front orientation information and the target multimedia information are fed back to the device for sending the representation information.

In an embodiment of the present disclosure, presenting the representation information characterized by the four-dimensional time-space model includes: decoding the four-dimensional time-space model to obtain a decoded four-dimensional time-space model; and presenting the representation information characterized by the four-dimensional time-space model according to the decoded four-dimensional time-space model.

In an embodiment of the present disclosure, further, the four-dimensional time-space model may be compressed. In this case, the decoding process may include decompressing the four-dimensional time-space model.

In an embodiment of the present disclosure, further, the four-dimensional time-space model may be encrypted. In this case, the decoding process may include decrypting the four-dimensional time-space model.

Figure 4:
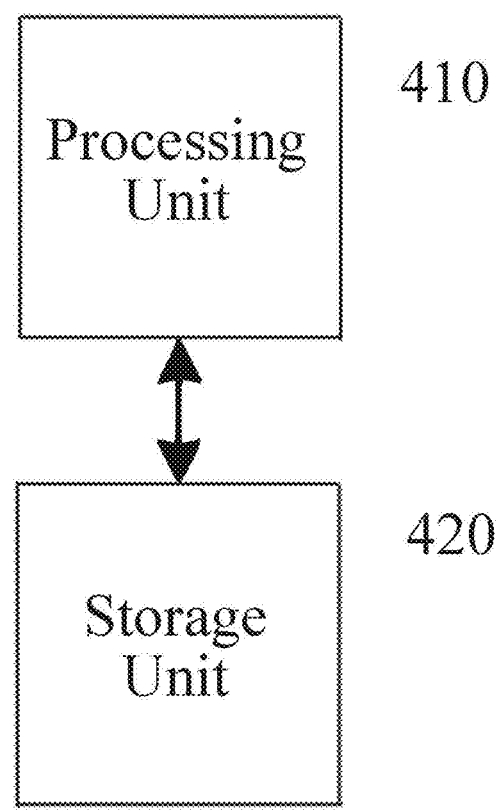
FIG. 4 is a block diagram illustrating a computing device provided by an embodiment of the present disclosure

In an embodiment of the present disclosure, as shown in FIG. 4, the above method may be performed by a computing device for presenting multimedia information. In an embodiment of the present disclosure, a computing device for presenting such multimedia information may be provided, including:

a processor 410; and a memory 420 for storing instructions executable by the processor 410;

wherein the processor 410 is configured to perform the above steps of the method by executing the instructions.

In the embodiments of the present disclosure, a method and a device for presenting multimedia information are provided, in which representation information is acquired, the representation information including electromagnetic-field spectral information for representing an object, the electromagnetic-field spectral information being observable for a naked eye and/or acquirable for a device; a four-dimensional time-space model for characterizing the representation information is established according to the acquired representation information, the four-dimensional time-space model having an attribute for characterizing in a digital form variation of the representation information over time; and the representation information characterized by the four-dimensional time-space model is presented. In the solution, the four-dimensional time-space model has an attribute for characterizing in a digital form variation of the representation information over time. Thereby, the problem of delay in presenting representation information may be solved to some degree. Therefore, the solution may solve the defects of delay in the related art to some degree.

Figure 2A:
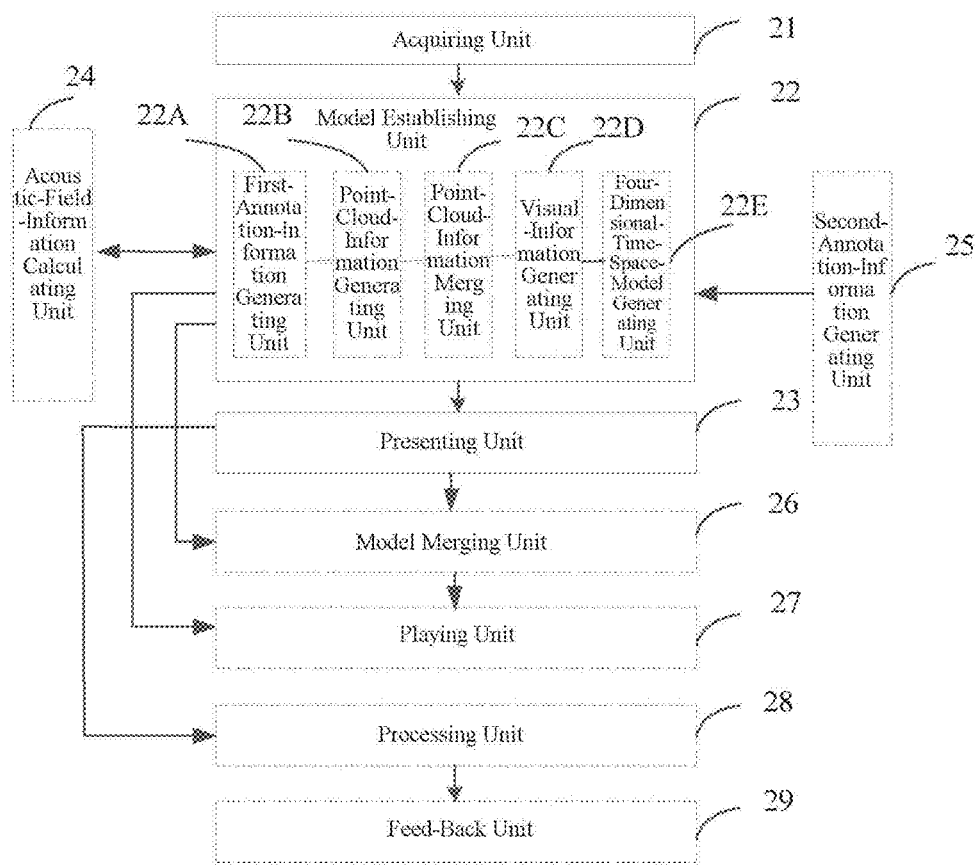
FIG. 2A is a block diagram illustrating a device for presenting multimedia information according to an embodiment of the present disclosure.

Referring to FIG. 2A, in an embodiment of the present disclosure, there is also provided a device for presenting multimedia information, including:

an acquiring unit 21, configured to acquire representation information. The representation information includes electromagnetic-field spectral information which is for representing an object and may be observable for a naked eye and/or acquirable for a device;

a model establishing unit 22, configured to establish a four-dimensional time-space model for characterizing the representation information based on the acquired representation information. The four-dimensional time-space model has an attribute for characterizing variation of the representation information over time in a digital form;

a presenting unit 23, configured to present the representation information characterized by the four-dimensional time-space model.

In an embodiment of the present disclosure, the electromagnetic-field spectral information acquired by the acquiring unit 21 may be emitted by an object, or be reflected by an object, or may be refracted by an object, which is not limited herein.

In an embodiment of the present disclosure, the electromagnetic-field spectral information acquired by the acquiring unit 21 may include at least one of radio wave information, infrared ray information, visible light information, ultraviolet ray information, X-ray information, and gamma ray information, wherein the visible light information may include a laser light.

In an embodiment of the present disclosure, the object corresponding to the representation information may include an object of any visual size and any angle indoor and/or outdoor.

In an embodiment of the present disclosure, the acquiring unit 21 may acquire representation information at 24 frames to 120 frames per second.

In an embodiment of the present disclosure, the representation information acquired by the acquiring unit 21 may be representation information at different space points and different time points.

In an embodiment of the present disclosure, the four-dimensional time-space model at least includes the following attributes:

a spatial-position attribute, which may refer to a coordinate in a coordinate system fixed over time for each point of an object at any moment;

an appearance attribute, which may refer to a texture and a spectral characteristic (such as color) of a surface of an object at any time, or a geometric characteristic (such as normal, curvature, smoothness, etc.) of a surface of an object;

a sound attribute;

a motion attribute, which may refer to a motion velocity vector, an acceleration vector of each point on an object at any moment, or may refer to an angular velocity vector or an angular acceleration vector of each section of an object which may be seen as a rigid body; and other attribute, which may refer to at least one kind of information that may be inferred from the representation information or variation of the representation information over time, including category, identity, material, mutual relation, etc.

The four-dimensional time-space model may be stored in a storage medium in a digital data form. The digital data form may be stored, presented, retrieved, edited, transmitted, encrypted and used for more advanced intelligent applications.

In an embodiment of the present disclosure, after the four-dimensional time-space model is established by the model establishing unit 22, the four-dimensional time-space model may be further modified, improved and optimized.

In practical application, in addition to the electromagnetic-field spectral information for representing an object, which may be observable for a naked eye and/or acquirable for a device, the representation information may also include acoustic-field information. In this case, in the embodiment of the present disclosure, further, the representation information may also include acoustic-field information which may be sensed by ear and/or acquirable for a device.

The device also includes an acoustic-field-information calculating unit 24, configured to calculate acoustic-field information of an object corresponding to the representation information according to the representation information.

The model establishing unit 22 establishing a four-dimensional time-space model for characterizing the representation information according to the representation information may specifically include: establishing a four-dimensional time-space model for characterizing the representation information and the acoustic-field information according to the representation information and the acoustic-field information.

In an embodiment of the present disclosure, the acoustic information described may not only include audio information but also may include information about a spatial position of a sound source. Moreover, the acoustic information may include acquired sound wave information and/or ultrasound wave information.

In an embodiment of the present disclosure, optionally, the model establishing unit 22 may include a first-annotation-information generating unit 22A, a point-cloud-information generating unit 22B, a point-cloud-information merging unit 22C, a visual-information generating unit 22D and a four-dimensional-time-space-model generating unit 22E.

Wherein the first-annotation-information generating unit 22A is configured to process the representation information to obtain first annotation information.

The point-cloud-information generating unit 22B is configured to obtain first point-cloud information containing geometric information and second point-cloud information containing texture information according to the first annotation information and the representation information.

The point-cloud-information merging unit 22C is configured to merge the first point-cloud information and the second point-cloud information to obtain target point-cloud information.

The visual-information generating unit 22D is configured to obtain visual information according to the target point-cloud information.

The four-dimensional-time-space-model generating unit 22E is configured to obtain a space model according to the visual information, merge the space models of a plurality of moments to obtain a space module, and obtain the four-dimensional time-space model according to the obtained space module, the first annotation information and second annotation information.

Further, the representation information may also include acoustic-field information which can be sensed by ear and/or acquirable for a device.

The device may also include an acoustic-field-information calculating unit 24, configured to calculate acoustic-field information of an object corresponding to the representation information according to the representation information.

The four-dimensional-time-space-model generating unit 22E obtaining a space model according to the visual information may specifically be: merging the visual information and the acoustic-field information to obtain the space model.

Further, the point-cloud-information generating unit 22B may include a second-annotation-information generating unit 25, configured to process the target point-cloud information to obtain second annotation information.

In this case, the visual-information generating unit 22D obtaining visual information according to the target point-cloud information may specifically be:

obtaining the visual information according to the second annotation information and the target point-cloud information.

Further, the visual-information generating unit 22D is also configured to optimize a geometric vertex position of the target point-cloud information and calculate a normal of the target point-cloud information, to obtain a first result;

perform a surface fitting process and a triangular meshing process on the first result to obtain a second result; and obtain the visual information according to the second result.

Optionally, the first-annotation-information generating unit 22A processing the representation information to obtain first annotation information may specifically be:

performing a digital image process and analysis on the representation information to obtain the first annotation information.

In an embodiment of the present disclosure, the first-annotation-information generating unit 22A performing digital image process on the representation information may be conducted in the following manner: segmenting, detecting, tracking or identifying the representation information.

In an embodiment of the present disclosure, the sequence of segmentation, detection, tracking and identification is not limited. For example, the representation information may be firstly segmented and then detected, or may be firstly detected and then segmented. In order to improve the accuracy of the first annotation information, segmentation, detection, tracking and identification may be performed repeatedly for several times. For example, after a cycle of segmentation, detection, tracking and identification is performed, depending on the result, at least one more cycle of segmentation, detection, tracking and identification may be performed to improve the accuracy.

In an embodiment of the present disclosure, segmentation may refer to segmenting the image into a foreground section and a background section. For example, the image is segmented into a sky section, a ground section and other sections. Detection may refer to detecting a passenger, detecting a license plate of a car, and so on. Tracking may refer to tracking an arm movement of a person, for example. Identification may refer to identify a vehicle, for example.

In an embodiment of the present disclosure, the point-cloud-information generating unit 22B obtaining first point-cloud information containing geometric information according to the first annotation information and the representation information may specifically be:

processing the representation information according to the first annotation information to obtain coordinate information of an object corresponding to the representation information; and generating first point-cloud information containing the geometric information according to the coordinate information.

In an embodiment of the present disclosure, the coordinate information of the object corresponding to the representation information may correspond to different coordinate systems at different moments. In this case, in order to improve the accuracy of the first point-cloud information, after the coordinate information of the object corresponding to the representation information is obtained, the point-cloud-information generating unit 22B may also merge coordinate information of the object corresponding to the representation information in different local coordinate systems at different moments to the same coordinate system, and then, generate the first point-cloud information containing the geometric information according to the coordinate information merged to the same coordinate system.

Optionally, the point-cloud-information generating unit 22B obtaining second point-cloud information containing texture information according to the first annotation information and the representation information may specifically be:

extracting information from the representation information according to the first annotation information in a point-by-point manner and/or by image synthesis, to obtain the second point-cloud information containing texture information.

Optionally, the visual-information generating unit 22D obtaining the visual information according to the second annotation information and the target point-cloud information may specifically be:

calculating surface normal information of the object according to the second annotation information and the target point-cloud information; and obtaining the visual information according to the surface normal information.

In an embodiment of the present disclosure, optionally, the device may also include a model merging unit 26, configured to merge the four-dimensional time-space model and a first time-space model, to obtain a target four-dimensional time-space model, the first time-space model is for characterizing representation information of an object at a place where the multimedia information is presented.

In this case, the presenting unit 23 presenting the representation information characterized by the four-dimensional time-space model may specifically be:

presenting the representation information characterized by the four-dimensional time-space model and the representation information characterized by the first time-space model according to the target four-dimensional time-space model.

For example, the scenario corresponding to the representation information characterized by the four-dimensional time-space model is a seaside scenario, and the scenario corresponding to the representation information characterized by the first time-space model is an office desk scenario. In this case, the scenario presented by the presenting unit 23 may be a scenario merging the seaside at a front side of the office desk.

Further, a human body or an object may be detected, tracked and identified. A real physical region may be superposed on a virtual region. For example, an observer wearing a VR helmet sees grassland, while in reality, the observer is in a room with a wall. At this time, through "detection based on objects", information of the real physical wall may be superposed on the grassland in the VR helmet, to present translucent wall in the grassland. For another example, through human hand detection, a gesture of a real hand may be detected, and then a virtual hand may be superposed on a four-dimensional model. That is, some virtual scenarios may be merged. The device may also include a model merging unit 26, configured to merge the four-dimensional time-space model, a first time-space model and a second time-space model which are located locally at the device for presenting the multimedia information, to obtain a target four-dimensional time-space model, the first time-space model is for characterizing representation information of an object at a place where the multimedia information is presented, and the second time-space model is for characterizing representation information of a virtual object.

In this case, the presenting unit 23 presenting the representation information characterized by the four-dimensional time-space model may specifically be:

presenting the representation information characterized by the four-dimensional time-space model, the representation information characterized by the first time-space model and the representation information characterized by the second time-space model according to the target four-dimensional time-space model.

For example, the scenario corresponding to the representation information characterized by the four-dimensional time-space model is a seaside scenario, and the scenario corresponding to the representation information characterized by the first time-space model is an office desk scenario. Then, the scenario presented by the presenting unit 23 may be a scenario merging the seaside at a front side of the office desk. Further, if a pot of flower is to be presented on the office desk while in reality there is no flower on the desk. In this case, the flower may be characterized by a second time-space model, and the four-dimensional time-space model, the first time-space model and the second time-space model locally at the device for presenting the multimedia information are merged to obtain a target four-dimensional time-space model. Then, the scenario presented by the presenting unit 23 may be a scenario in which seaside is before the office desk, and flower is placed on the office desk.

In an embodiment of the present disclosure, the presented scenario not only has a picture, but also has a sound. To this end, the representation information may also include acoustic-field information which can be sensed by ear and/or acquirable for a device. The four-dimensional time-space model further characterizes acoustic-field information of an object corresponding to the representation information.

In this case, the device may also include a playing unit 27, configured to play the acoustic-field information characterized by the four-dimensional time-space model.

In an embodiment of the present disclosure, in order to improve the similarity between the scenario corresponding to the presented representation information and the real scenario, the playing unit 23 may present the representation information characterized by the four-dimensional time-space model with reference to front orientation information of the device for presenting the multimedia information. To this end, further, the device may also include a processing unit 28, configured to determine a front orientation of a device for presenting the multimedia information.

In this case, the presenting unit 23 presenting the representation information characterized by the four-dimensional time-space model may specifically be:

presenting the representation information characterized by the four-dimensional time-space model according to the front orientation.

In an embodiment of the present disclosure, optionally, the processing unit 28 may determine a front orientation of a device for presenting the multimedia information in the following manner:

resolving an attitude of the device for presenting the multimedia information through an associated inertial navigation, to obtain the front orientation information of the device for presenting the multimedia information.

In the embodiment, the inertial navigation may be any one or any combination of a gyroscope, a magnetometer, and an accelerometer.

In an embodiment of the present disclosure, accuracy of an observer-interested part may be selectively improved. Further, the device may also include a processing unit 28, configured to determine a front orientation of a device for presenting the multimedia and target multimedia information.

The device may also include a feed-back unit 29, configured to feed back the front orientation and the target multimedia information to a device for sending the representation information.

For example, the scenario corresponding to the representation information has a beach, a person and a sailboat. If the eyeball of the user holding the device for presenting the multimedia information is fixed on the person, the person may be taken as the target multimedia information. Then, during the step of acquiring representation information, the device for sending the four-dimensional time-space model may only acquire representation information of the person and not acquire representation information of the sailboat.

In an embodiment of the present disclosure, the processing unit 28 may also determine the multimedia information through an "eyeball" of a camera of the device for presenting the multimedia information.

In an embodiment of the present disclosure, the presenting unit 23 may include a four-dimensional-space-time-model processing sub-unit, configured to decode the four-dimensional time-space model to obtain a decoded four-dimensional time-space model; and a presenting sub-unit, configured to present the representation information characterized by the four-dimensional time-space model according to the decoded four-dimensional time-space model.

Further, in the embodiment of the present disclosure, the four-dimensional time-space model may be compressed. In this case, the decoding process may include decompressing the four-dimensional time-space model.

In an embodiment of the present disclosure, further, the four-dimensional time-space model may be encrypted. In this case, the decoding process may include decrypting the four-dimensional time-space model.

It should be noted that, in the embodiment of the present disclosure, the first time-space model and the second time-space model as described may be established by the device for presenting the multimedia information in advance or in real time. Alternatively, the first time-space model and the second time-space model may be established in advance by another device, or may be established by another device and sent to the device for presenting the multimedia information in real time. This is not limited in the present disclosure.

In an embodiment of the present disclosure, in some scenarios, it is possible that the presenting unit 23 only presents the representation information characterized by the four-dimensional space-time model. For example, in a remote office or a remote communication scenario, the device for presenting the multimedia information may only require experience of a "real remote" scenario sent from the device for sending the four-dimensional time-space model. In this case, only the representation information characterized by the four-dimensional time-space model is required to be presented by the presenting unit 23. In some scenarios, based on the representation information characterized by the four-dimensional time-space model, the representation information characterized by the first time-space model or the representation information characterized by the second time-space model may be further presented. In addition to that, the terminal for presenting representation information may also add some virtual props. For example, the device for presenting multimedia information requires not only experience of the scenario sent from the device for sending the four-dimensional time-space model, but also requires virtual props to be added in the scenario. For example, by swing a hand, a white board may appear in the sky, or for a game, some virtual props may be added (for example, a "lightning" is emitted from a hand and hits a rock in the scenario).

In an embodiment of the present disclosure, the acquiring unit 21 may also acquire representation information from other devices, or may acquire representation information respectively sent from multiple devices. For example, representation information sent from a first sending terminal corresponds to a scenario of the Temple of Heaven; representation information sent from a second sending terminal corresponds to a scenario of the Eiffel Tower. Then, the Temple of Heaven and the Eiffel Tower may be presented in parallel.

In an embodiment of the present disclosure, the acquiring unit 21 may be any one of a cylindrical shape, a rectangular parallelepiped shape, a prismatic shape, a circular shape, a spherical shape, and a hemispherical shape, and may include at least one camera. The camera may be a color camera, a depth camera or an infrared camera.

Figure 2B:
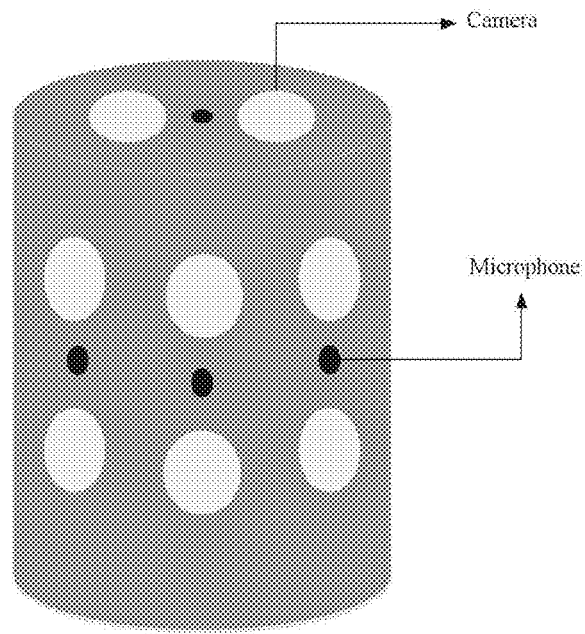
FIG. 2B is a schematic diagram illustrating an acquiring unit according to an embodiment of the present disclosure.
Figure 2C:
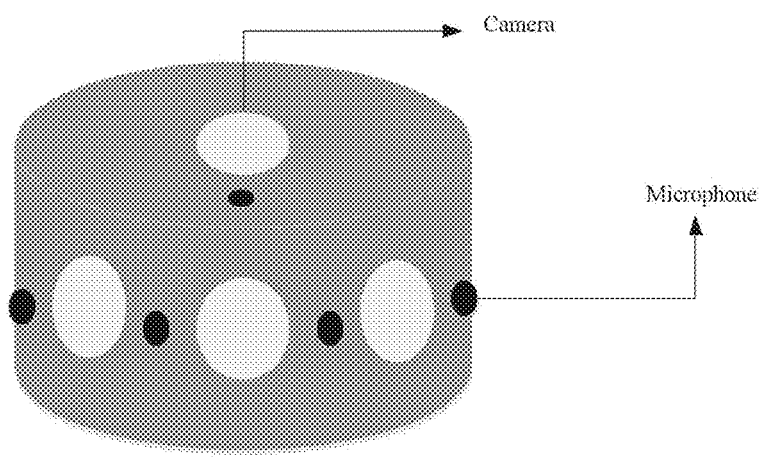
FIG. 2C is another schematic diagram illustrating an acquiring unit according to an embodiment of the present disclosure.
Figure 2D:
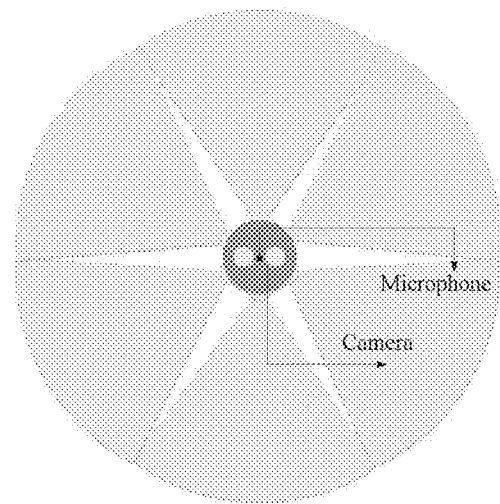
FIG. 2D is a top view of an acquiring unit according to an embodiment of the present disclosure.
Figure 2E:
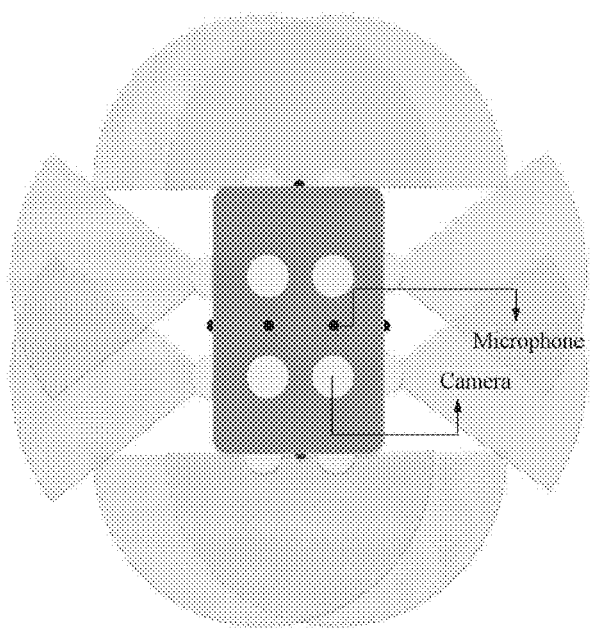
FIG. 2E is a side view of an acquiring unit according to an embodiment of the present disclosure.

Further, the acquiring unit 21 may also include at least one microphone, as shown in FIGS. 2B and 2C. In addition, FIG. 2D is a top view of FIG. 2B or 2C, and FIG. E is a side view of FIG. 2B or 2C.

Optionally, the acquiring unit 21 may include 8 pairs of color camera and 8 microphones, of which 1 pair of color cameras are installed at the top thereof, each color camera having a view angle of 180 degree; 6 pairs of color cameras are installed at the sides thereof, each color camera having a view angle of 70 degree; 1 pair of color cameras are installed at the top thereof, each color camera having a view angle of 180 degree; and one microphone is installed between each pair of cameras.

Optionally, the acquiring unit 21 may also be the following form:

one or one pair of color cameras are installed at the top thereof, each having a view angle of 45-180 degree; 2 or 8 pairs of color cameras are installed at the sides thereof, each having a view angle of 45-180 degree; one microphone is installed. Alternatively, one microphone is installed between each pair of cameras. Optionally, the number of the microphones may between 1 and 8.

In an embodiment of the present disclosure, optionally, cameras at the top may be any one kind or any combination of a stereo camera, a multi-focal-length camera, a structured light camera, a time-of-flight (ToF) camera, a light field camera set.

In an embodiment of the present disclosure, optionally, cameras at the sides may be any one kind or any combination of a stereo camera, a multi-focal-length camera, a structured light camera, a time-of-flight (ToF) camera, a light field camera set.

For example, the acquiring unit 21 may be a cylindrical shape. Six pairs of binocular cameras are installed at the side surface thereof, and each camera has a view angle of 70 degree. One pair of binocular cameras is installed at the top surface of the cylinder, and one pair of binocular cameras is installed at the bottom surface of the cylinder, each of the binocular cameras has a view angle of 180 degree. In this way, the full stereoscopic field of view may be covered. All of the cameras are calibrated in advance and has determined parameter matrix. The acquiring unit 21 may also include eight microphones built inside.

In an embodiment of the present disclosure, the color cameras may be composed of an optical lens, an image sensor and an image signal processing unit.

A vision processing unit (VPU) may include a model establishing unit 22 and a processing unit 23. The cameras may be coupled to VPU chips via mobile industry processor interfaces (MIPIs). One VPU chip may process data sent from two pairs of cameras. Therefore, one cylinder may have four VPU chips inside.

In an embodiment of the present disclosure, the model establishing unit 22 may include a processor, a graphics card, a memory, a display memory, a flash memory, a hard disk, wireless transmission, wired transmission and multiple bus interface chip.

Application scenarios of the embodiments of the present disclosure will be described below.

Figure 3A:
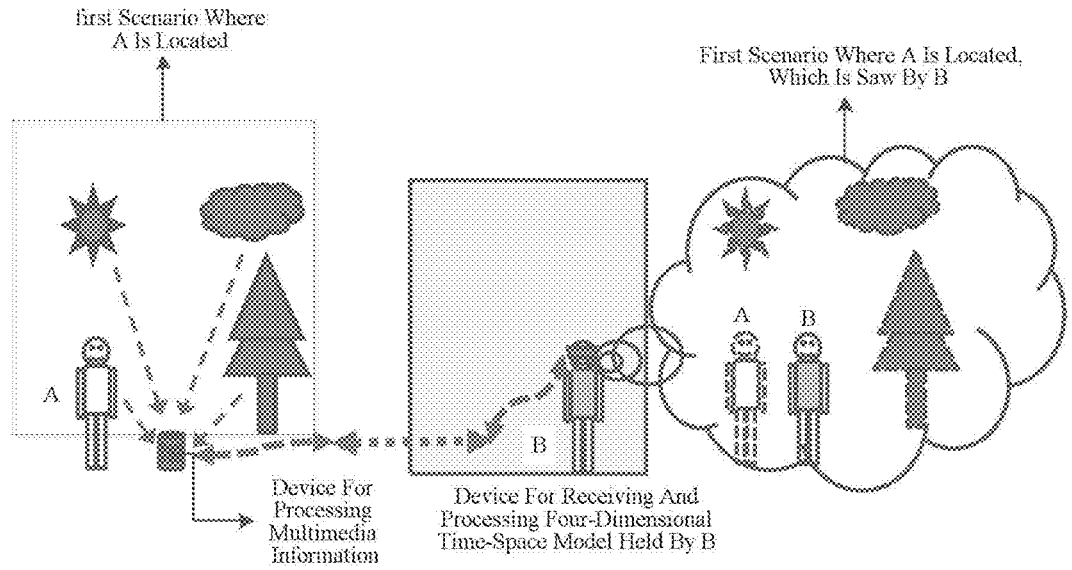
FIG. 3A is a schematic diagram illustrating a scenario provided by an embodiment of the present disclosure.

As shown in FIG. 3A, a person A is in a first scenario, and a person B is in a second scenario. Through the method provided by the embodiments of the present disclosure, A and the surroundings of A may be "presented remotely" before B in real time, and A and B may interact with each other.

Figure 3B:
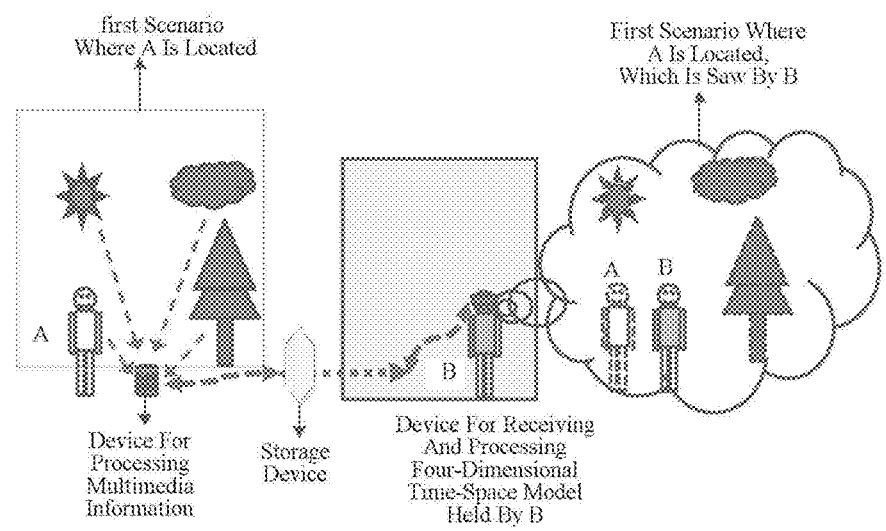
FIG. 3B is a schematic diagram illustrating another scenario provided by an embodiment of the present disclosure.

Further, the device for processing multimedia information may store the four-dimensional time-space model in a storage device in advance. The device for receiving and processing a four-dimensional time-space model held by B may acquire the four-dimensional time-space model from the storage device, as shown in FIG. 3B. In this case, B may see a scenario different from what is shown in FIG. 3A.

Figure 3C:
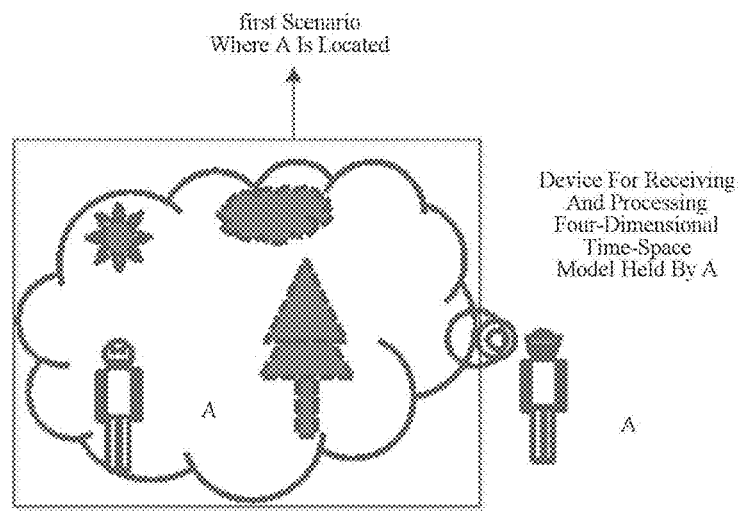
FIG. 3C is a schematic diagram illustrating another scenario provided by an embodiment of the present disclosure.

When the device for processing multimedia information stores the four-dimensional time-space model in the storage device, A may hold a device for receiving and processing a four-dimensional time-space model, which may acquire the four-dimensional time-space model from the storage device. Thereby, A may experience the first scenario where A was located in a past time point, as shown in FIG. 3C.

Figure 3D:
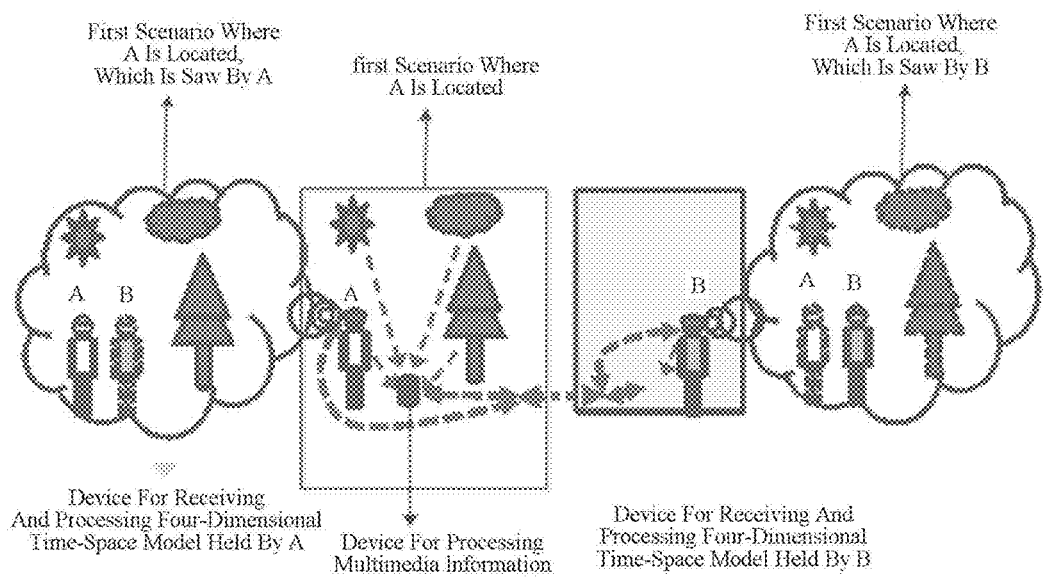
FIG. 3D is a schematic diagram illustrating another scenario provided by an embodiment of the present disclosure.

As shown in FIG. 3D, a person A is in a first scenario, and a person B is in a second scenario. Through the first embodiment of the present disclosure, A and the surroundings of A may be "presented remotely" before B in real time, and A and B may interact with each other. Through the first embodiment of the present disclosure, A and B may experience "remote reality" and "mixed reality" in both directions and in real time. A may experience the first scenario superposed with B, and B may experience A and the first scenario where A is located. It should be noted that, A and B may experience other options for scenarios to be experienced. For example, A and B may select to see the first scenario where A is located or to see the second scenario where B is located, or to see a third scenario where other party is located. A and B may see the same reality or the same virtual scenario, or may see different realities or see different virtual scenarios.

Figure 3E:
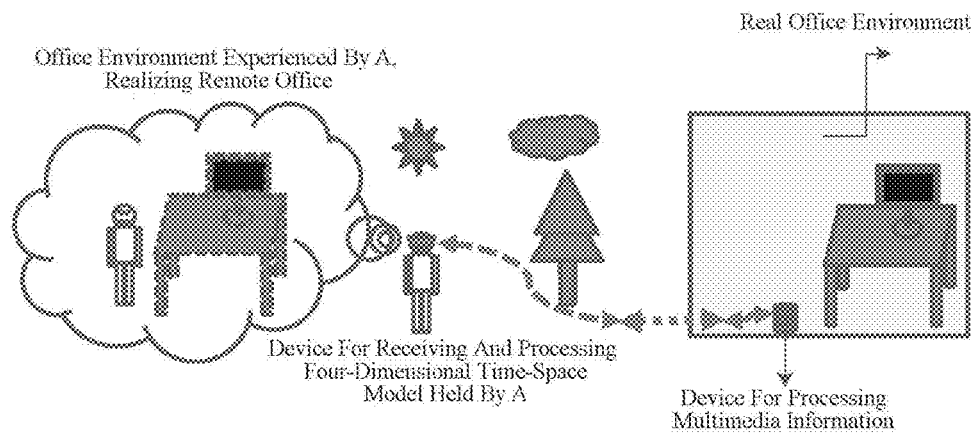
FIG. 3E is a schematic diagram illustrating another scenario provided by an embodiment of the present disclosure.

FIG. 3E shows a scenario in which through the embodiments provided by the present disclosure, a person A experiences remote office.

Figure 3F:
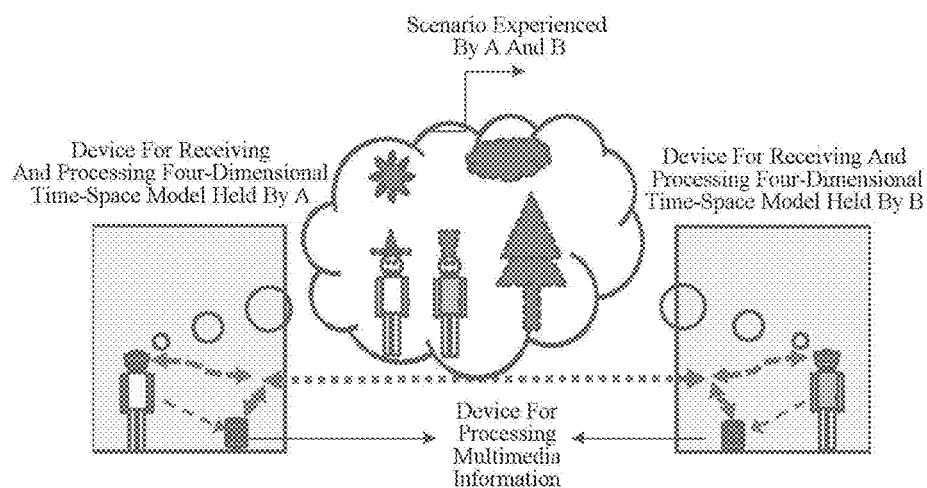
FIG. 3F is a schematic diagram illustrating another scenario provided by an embodiment of the present disclosure.

FIG. 3F shows a scenario in which through the embodiments provided by the present disclosure, both A and B may experience a virtual environment, and further, may interact with each other, as if they were in there.

In an embodiment of the present disclosure, the above device/sub-device, unit/sub-unit, module/sub-module may be implemented in part by hardware and in part by software, or all of them are implemented by hardware, or all of them are implemented by software.

The methods and devices provided herein may not be inherently related to any particular computer, virtual system, or other device. Various general purpose systems may also be used with examples described herein. From the above description, the structure required for constructing such a device is obvious. Furthermore, the disclosure is not directed to any particular programming language. It is to be understood that the contents described herein may be implemented with a variety of programming languages, and the above description of a particular language is for the purpose of disclosing preferred embodiments of the present disclosure.

In the specification provided herein, numerous specific details are set forth. It will be understood, however, that embodiments of the disclosure may be practiced without these specific details. In some instances, well-known methods, structures, and techniques have not been shown in detail in order not to obscure the understanding of this specification.

Similarly, it is should be understood that in order to simplify the present disclosure and help to understand one or more aspects of the present disclosure, in the above description of the exemplary embodiments of the present disclosure, the features of the present disclosure may sometimes be grouped a single embodiment, diagram and the description thereof. However, the disclosed method should not be interpreted as reflecting the intention that the claimed invention requires more features than are expressly recited in each claim. Rather, as recited in the claims, the aspects of the present disclosure should have less features than previously disclosed in a single embodiment. Accordingly, the claims following the Detailed Description are hereby expressly incorporated into this Detailed Description, with each claim standing on its own as a separate embodiment of the present disclosure.

It should be understood by those skilled in the art that in the device according to the embodiments, the modules may be adaptively changed and placed in one or more devices different from those in the embodiments. Several modules in the embodiments may be combined into one module or unit or component, and furthermore, they may be divided into sub-modules or sub-units or sub-components. Any combination of features, any steps of the method, or any units of the device disclosed in this specification (including accompanying claims, abstract, and drawings) is possible, unless at least some of the features and/or processes or modules are exclusive to one another. Unless otherwise expressly stated, each feature disclosed in the specification (including accompanying claims, abstract and drawings) may be replaced by alternative features that provide the same, equivalent, or similar purpose.

In addition, it should be understood by those skilled in the art that, although some embodiments described herein include certain features other than those included in other embodiments, combinations of features of different embodiments are meant to be within the scope of the present disclosure and form a different embodiment. For example, in the claims, any one of the claimed embodiments may be used in any combination.

The various device embodiments of the present disclosure may be implemented in hardware, or in software modules operating on one or more processors, or in combinations thereof. It should be appreciated by those skilled in the art that in practice, some or all of the functions of some or all of the modules in the device according to the embodiments of the present disclosure may be implemented using a microprocessor or a digital signal processor (DSP). The present disclosure may also be implemented as a device program (e.g., a computer program and a computer program product) for performing a part or all of the methods described herein. Such program for implementing the present disclosure may be stored on a computer-readable medium, or may have a form of one or more signals. Such signals may be downloaded from an Internet web site, provided on a carrier, or provided in any other form.

It should be noted that in the above embodiments are only for illustration of the present disclosure and not intended to limit the present disclosure. Those skilled in the art may devise alternative embodiments without departing from the scope of the appended claims. In the claims, any reference signs placed between parentheses shall not be construed as limiting the claim. The word "include" does not exclude the presence of elements or steps that are not listed in the claims. The word "a" or "an" does not exclude a plurality of such elements. The present disclosure may be implemented by means of hardware including several distinct elements and by means of a suitably programmed computer. In a claim enumerating a unit with several means, some of these means may be embodied by the same hardware. The words "first", "second" and "third" used herein do not denote any order. These words can be interpreted as names.

What is claimed is:

1. A method for presenting multimedia information, which is performed by a computing device, the method comprising:

by one or more processors, acquiring representation information, the representation information including electromagnetic-field spectral information for representing an object, the electromagnetic-field spectral information being observable for a naked eye and/or acquirable for a device;

by the one or more processors, establishing a four-dimensional time-space model for characterizing the representation information according to the acquired representation information, the four-dimensional time-space model having an attribute for characterizing in a digital form variation of the representation information over time; and by the one or more processors, presenting the representation information characterized by the four-dimensional time-space model on a presenting unit, wherein the step of establishing a four-dimensional time-space model for characterizing the representation information according to the acquired representation information, comprises:

processing the representation information to obtain first annotation information;

obtaining first point-cloud information containing geometric information and second point-cloud information containing texture information according to the first annotation information and the representation information;

merging the first point-cloud information and the second point-cloud information to obtain target point-cloud information;

obtaining visual information according to the target point-cloud information;

obtaining a space model according to the visual information, merging space models of a plurality of moments to obtain a space module; and obtaining the four-dimensional time-space model according to the obtained space module, the first annotation information and second annotation information.

2. The method according to claim 1, wherein the representation information further comprises acoustic-field information which can be sensed by ear and/or acquirable for a device;

before the step of establishing a four-dimensional time-space model according to the acquired representation information, the method further comprises:

calculating acoustic-field information of an object corresponding to the representation information according to the representation information; and the step of establishing a four-dimensional time-space model for characterizing the representation information according to the representation information comprises:

establishing a four-dimensional time-space model for characterizing the representation information and the acoustic-field information according to the representation information and the acoustic-field information.

3. The method according to claim 1, wherein the representation information further comprises acoustic-field information which can be sensed by ear and/or acquirable for a device;

before the step of obtaining a space model according to the visual information, the method further comprises:

calculating acoustic-field information of an object corresponding to the representation information according to the representation information; and the step of obtaining a space model according to the visual information comprises: merging the visual information and the acoustic-field information to obtain the space model.

4. The method according to claim 1, wherein after the step of merging the first point-cloud information and the second point-cloud information to obtain target point-cloud information, and before the step of obtaining visual information according to the target point-cloud information, the method further comprises: processing the target point-cloud information to obtain second annotation information; and the step of obtaining visual information according to the target point-cloud information comprises: obtaining the visual information according to the second annotation information and the target point-cloud information.

5. The method according to claim 4, wherein the step of obtaining the visual information according to the annotation information and the target point-cloud information comprises:

optimizing a geometric vertex position of the target point-cloud information and calculating a normal of the target point-cloud information, to obtain a first result;

performing a surface fitting process and a triangular meshing process on the first result to obtain a second result; and obtaining the visual information according to the second result.

6. The method according to claim 4, wherein the step of obtaining the visual information according to the second annotation information and the target point-cloud information comprises:

calculating surface normal information of the object according to the second annotation information and the target point-cloud information; and obtaining the visual information according to the surface normal information.

7. The method according to claim 1, wherein the step of processing the representation information to obtain first annotation information comprises:

performing digital image process and analysis on the representation information to obtain the first annotation information.

8. The method according to claim 1, wherein the step of obtaining first point-cloud information containing geometric information according to the first annotation information and the representation information comprises:
processing the representation information according to the first annotation information to obtain coordinate information of an object corresponding to the representation information; and
generating first point-cloud information containing the geometric information according to the coordinate information.

9. The method according to claim 1, wherein the step of obtaining second point-cloud information containing texture information according to the first annotation information and the representation information comprises:
extracting information from the representation information according to the first annotation information in a point-by-point manner and/or by image synthesis, to obtain the second point-cloud information containing texture information.

10. The method according to claim 1, wherein before the step of presenting the representation information characterized by the four-dimensional time-space model, the method further comprises:
merging the four-dimensional time-space model and a first time-space model, to obtain a target four-dimensional time-space model, the first time-space model is for characterizing representation information of an object at a place where the multimedia information is presented; and
the step of presenting the representation information characterized by the four-dimensional time-space model comprises: presenting the representation information characterized by the four-dimensional time-space model and the representation information characterized by the first time-space model according to the target four-dimensional time-space model.

11. The method according to claim 1, wherein before the step of presenting the representation information characterized by the four-dimensional time-space model, the method further comprises:
merging the four-dimensional time-space model and a first time-space model and a second time-space model which are located locally at the device, to obtain a target four-dimensional time-space model, the first time-space model is for characterizing representation information of an object at a place where the multimedia information is presented, and the second time-space model is for characterizing representation information of a virtual object; and
the step of presenting the representation information characterized by the four-dimensional time-space model comprises: presenting the representation information characterized by the four-dimensional time-space model, the representation information characterized by the first time-space model and the representation information characterized by the second time-space model according to the target four-dimensional time-space model.

12. The method according to claim 1, wherein the representation information further comprises acoustic-field information which can be sensed by ear and/or acquirable for a device; and the four-dimensional time-space model further characterizes acoustic-field information of an object corresponding to the representation information; and
the method further comprises:
playing the acoustic-field information characterized by the four-dimensional time-space model.

13. The method according to claim 1, wherein before the step of presenting the representation information characterized by the four-dimensional time-space model, the method further comprises: determining a front orientation of a device for presenting the multimedia information; and
the step of presenting the representation information characterized by the four-dimensional time-space model comprises: presenting the representation information characterized by the four-dimensional time-space model according to the front orientation.

14. The method according to claim 1, wherein the method further comprises:
determining a front orientation of a device for presenting the multimedia information and target multimedia information; and
feeding back the front orientation and the target multimedia information to a device for sending the representation information.

15. The method according to claim 1, wherein the step of presenting the representation information characterized by the four-dimensional time-space model comprises:
decoding the four-dimensional time-space model to obtain a decoded four-dimensional time-space model; and
presenting the representation information characterized by the four-dimensional time-space model according to the decoded four-dimensional time-space model.

16. A computing device for presenting multimedia information, comprising:
a processor; and
a memory for storing instructions executable by the processor;
wherein when executing the instructions, the processor is configured to perform: acquiring representation information, the representation information including electromagnetic-field spectral information for representing an object, the electromagnetic-field spectral information being observable for a naked eye and/or acquirable for a computing device;
establishing a four-dimensional time-space model for characterizing the representation information according to the acquired representation information, the four-dimensional time-space model having an attribute for characterizing in a digital form variation of the representation information over time; and
presenting the representation information characterized by the four-dimensional time-space model on a presenting unit,
wherein for the step of establishing a four-dimensional time-space model for characterizing the representation information according to the acquired representation information, the processor is configured to perform:
processing the representation information to obtain first annotation information;
obtaining first point-cloud information containing geometric information, second point-cloud information containing texture information according to the first annotation information and the representation information;
merging the first point-cloud information and the second point-cloud information to obtain target point-cloud information;

obtaining visual information according to the target point-cloud information;

obtaining a space model according to the visual information, merging space models of a plurality of moments to obtain a space module; and obtaining the four-dimensional time-space model according to the obtained space module, the first annotation information and second annotation information.

17. The computing device according to claim 16, wherein the representation information further comprises acoustic-field information which can be sensed by ear and/or acquirable for a computing device;

the processor is configured to perform: before the step of establishing a four-dimensional time-space model according to the acquired representation information, calculating acoustic-field information of an object corresponding to the representation information according to the representation information; and for the step of establishing a four-dimensional time-space model for characterizing the representation information according to the representation information, the processor is configured to perform: establishing a four-dimensional time-space model for characterizing the representation information and the acoustic-field information according to the representation information and the acoustic-field information.

18. The computing device according to claim 16, wherein the representation information further comprises acoustic-field information which can be sensed by ear and/or acquirable for a computing device;

the processor is configured to perform: before the step of obtaining a space model according to the visual information, calculating acoustic-field information of an object corresponding to the representation information according to the representation information; and for the step of obtaining a space model according to the visual information, the processor is configured to perform: merging the visual information and the acoustic-field information to obtain the space model.

* * * * *